(12) United States Patent
Lim et al.

(10) Patent No.: US 7,912,361 B2
(45) Date of Patent: Mar. 22, 2011

(54) IMAGE STABILIZING APPARATUS FOR CAMERA MODULE

(75) Inventors: Soo Cheol Lim, Incheon-si (KR); No Cheol Park, Seoul (KR); Myeong Gyu Song, Incheon-si (KR); Jae Ho Moon, Yongin-si (KR); Ho Seop Jeong, Seongnam-si (KR); Jae Hyuk Park, Yongin-si (KR)

(73) Assignee: Samsung Eletro-Mechanics Co., Ltd., Suwon (KR)

( * ) Notice: Subject to any disclaimer, the term of this patent is extended or adjusted under 35 U.S.C. 154(b) by 118 days.

(21) Appl. No.: 12/292,846

(22) Filed: Nov. 26, 2008

(65) Prior Publication Data
US 2009/0303594 A1    Dec. 10, 2009

(30) Foreign Application Priority Data

Jun. 9, 2008 (KR) ................. 10-2008-0053701

(51) Int. Cl.
*G03B 17/00* (2006.01)
*H04N 5/228* (2006.01)
(52) U.S. Cl. .................................. 396/55; 348/208.11
(58) Field of Classification Search .............. 396/55, 396/421; 348/208.99, 208.4, 208.7, 208.11
See application file for complete search history.

(56) References Cited

U.S. PATENT DOCUMENTS 5,745,800 A * 4/1998 Kanbara et al. ............. 396/55
6,064,827 A * 5/2000 Toyoda ....................... 396/55
2007/0236577 A1 * 10/2007 Ke et al. ................. 348/208.99
2008/0187301 A1 * 8/2008 Takahashi .................. 396/55
2009/0097834 A1 * 4/2009 Jang et al. .................. 396/55

FOREIGN PATENT DOCUMENTS

KR    10-2006-0032312    4/2006
KR    10-2008-0014454    2/2008

* cited by examiner

*Primary Examiner* — W. B. Perkey
*Assistant Examiner* — Noam Reisner

(57) ABSTRACT

The present invention relates to an image stabilizing apparatus for a camera module capable of effectively stabilizing an image of the camera module, implementing miniaturization and slimness, and reducing a manufacture cost of the camera module by supplying a two-axial correction structure to perform correction in an X axial direction or an Y axial direction of an automatic focusing unit through a ball holder having upper balls and lower balls.

To achieve the object, the present invention provides an image stabilizing apparatus for a camera module including; an automatic focusing unit with slide grooves having lengths in an X axial direction or in an Y axial direction perpendicular to an optical axis on a bottom surface; a driving unit for moving the automatic focusing unit in the X axial direction or the Y axial direction; a ball holder installed on the bottom surface of the automatic focusing unit and provided with upper balls slidably coupled to the slide grooves on a top surface and lower balls on a bottom surface; and a lower guide which is installed on the bottom surface of the ball holder and includes slide grooves on a top surface, wherein the slide grooves are slidably coupled with the lower balls of the ball holder and have lengths in the Y axial direction or the X axial direction perpendicular to a longitudinal direction of the slide grooves of the automatic focusing unit.

13 Claims, 2 Drawing Sheets

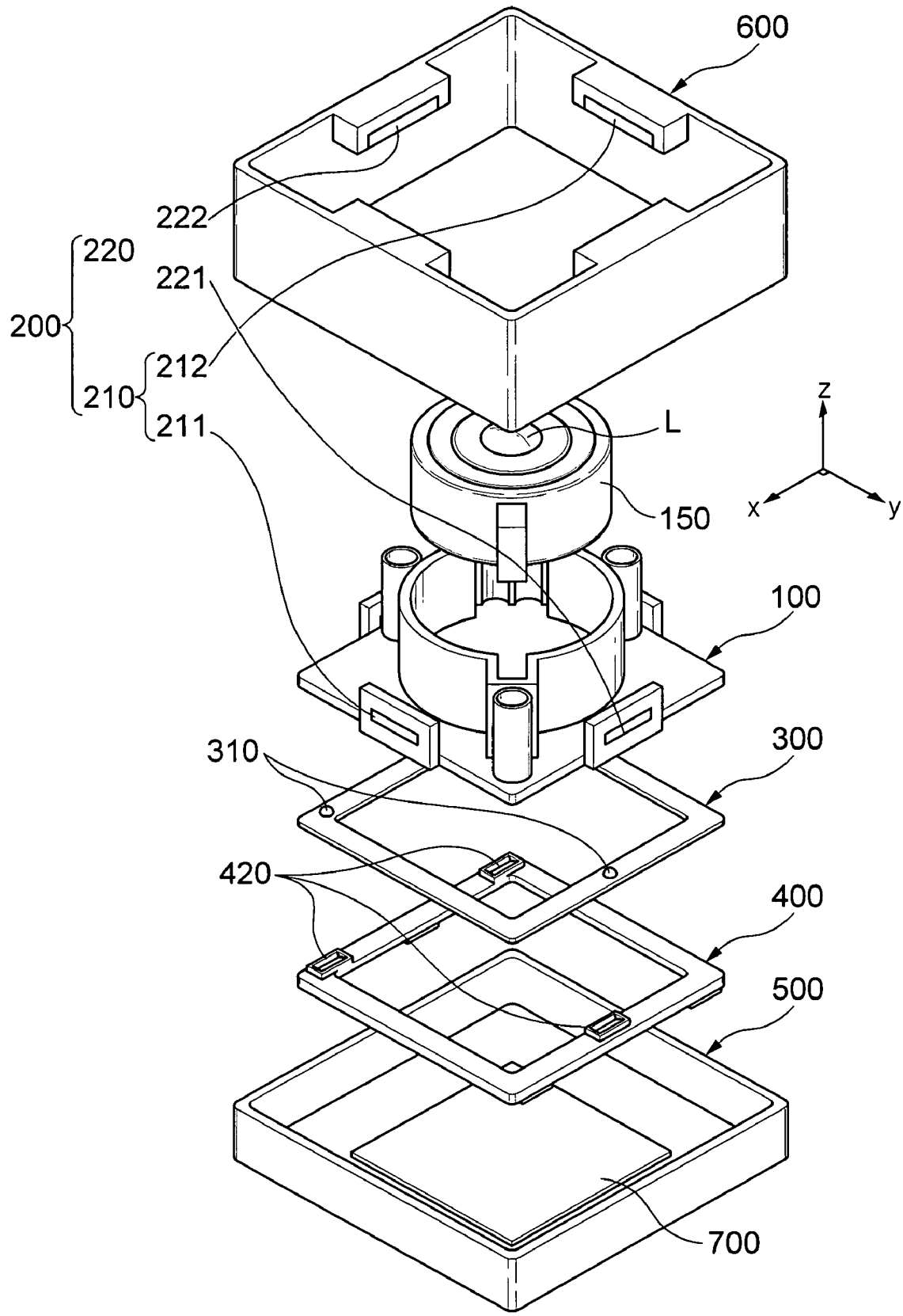
[FIG. 1]

[FIG. 2]
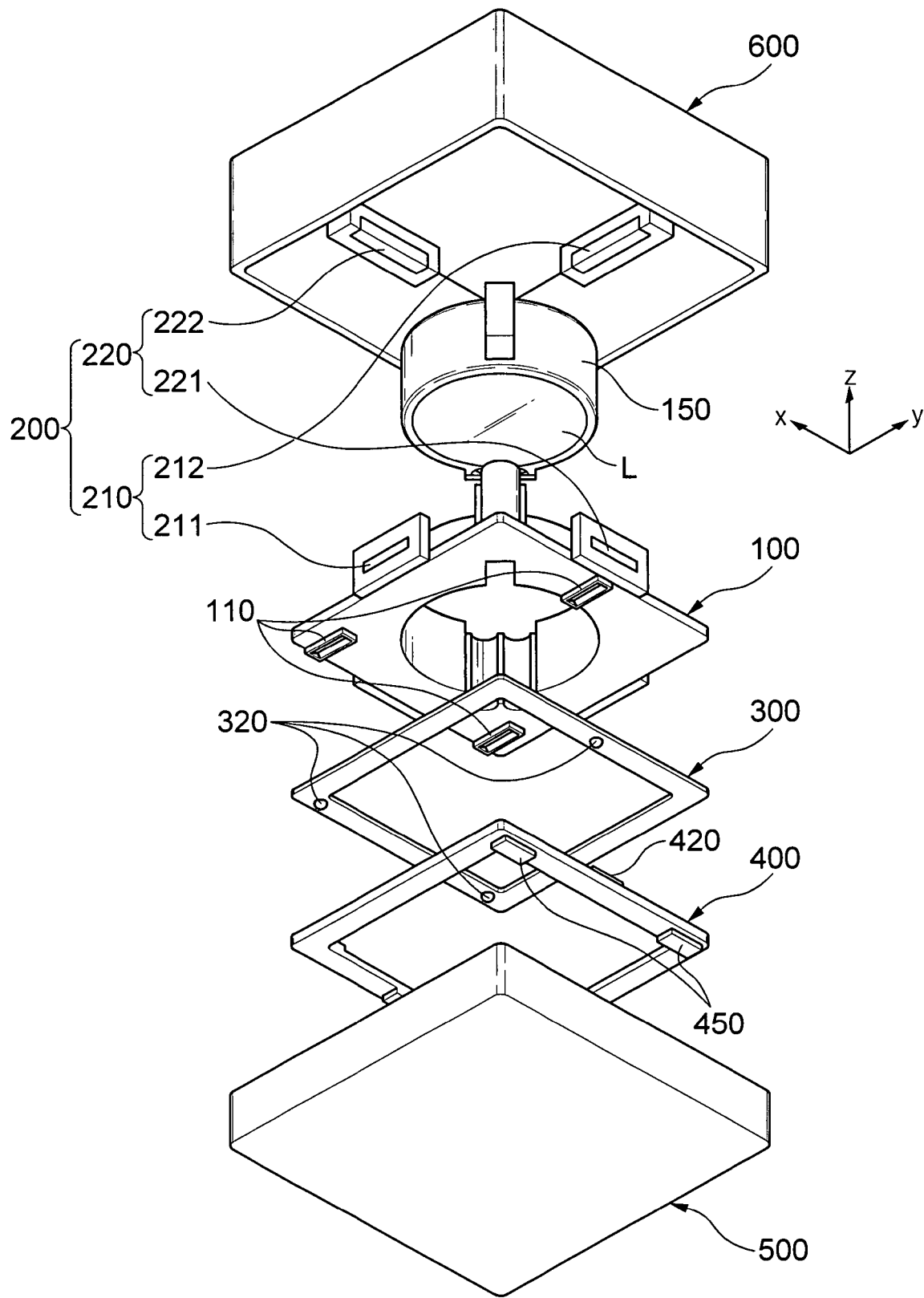

IMAGE STABILIZING APPARATUS FOR CAMERA MODULE

CROSS-REFERENCE TO RELATED APPLICATIONS

This application claims the benefit of Korean Patent Application No. 10-2008-0053701 filed with the Korea Intellectual Property Office on Jun. 9, 2008, the disclosure of which is incorporated herein by reference.

BACKGROUND OF THE INVENTION

1. Field of the Invention

The present invention relates to an image stabilizing apparatus for a camera module; and, more particularly, to an image stabilizing apparatus for a camera module capable of effectively stabilizing an image of the camera module, implementing miniaturization and slimness of the camera module and reducing a manufacture cost of the camera module by supplying a two-axial correction structure to perform correction in an X axial direction or an Y axial direction of an automatic focusing unit through a ball holder having upper balls and lower balls.

2. Description of the Related Art

Generally, an image stabilizing apparatus has been used to prevent deterioration of image quality due to a shake in shooting of a camera module.

Most of conventional image stabilizing apparatuses have been implemented in digital cameras because it was to easy to apply the image stabilizing apparatuses to the digital cameras in comparison with mobile small camera modules such as cellular phones in terms of a size.

Recently, as the mobile small camera module implementing an image with such high quality as that of an image in the digital camera has been demanded, development and study for applying the image stabilizing apparatus to the mobile small camera module have been progressed.

Most of the conventional image stabilizing apparatuses have been applied to the digital cameras and generally classified into four methods, that is, firstly, a moving method of an image stabilizing optical lens, secondly, an image sensor moving method, thirdly, a prism refraction method, and fourthly, a method for entirely leaning the camera module to cope with the shake.

However, the moving method of the image stabilizing optical lens complicates a redesign in changing an optical design due to driving of a corresponding optical lens, the image sensor moving method needs high driving precision and caused noise due to heat generation, the prism refraction method increases a cost and deteriorates image quality, and the method for entirely leaning the camera module to cope with the shake complicates construction of a product and causes a durability problem.

Particularly, a linear guide method as one of the conventional image stabilizing methods applied to the digital camera reduces a driving performance due to friction and a size of the mobile small cameral module adopting this method is sharply increased.

In order to overcome the above-described disadvantages, an image stabilizing technique using moving balls and slide grooves has been developed, however, because a constraint condition of a structure using the moving balls and the slide grooves is unstable, the moving balls are easily separated due to external impact, and because additional moving balls and slide grooves are applied to each horizontal axial direction changed for image stabilization, a volume in an optical axial direction is increased and the numbers of the moving balls and the corresponding slide grooves are increased, thereby driving up a manufacture cost.

SUMMARY OF THE INVENTION

The present invention has been invented in order to overcome the above-described disadvantages and problems of the conventional image stabilizing apparatuses for camera modules and it is, therefore, an object of the present invention to provide an image stabilizing apparatus for a camera module capable of effectively stabilizing an image of the camera module, implementing miniaturization and slimness of the camera module, and reducing a manufacture cost of the camera module by supplying a two-axial correction structure to perform correction in an X axial direction or an Y axial direction of an automatic focusing unit through a ball holder having upper balls and lower balls.

In accordance with one aspect of the present invention to achieve the object, there is provided an image stabilizing apparatus for a camera module including; an automatic focusing unit with slide grooves having lengths in an X axial direction or in an Y axial direction perpendicular to an optical axis on a bottom surface; a driving unit for moving the automatic focusing unit in the X axial direction or the Y axial direction; a ball holder installed on the bottom surface of the automatic focusing unit having upper balls slidably coupled to the slide grooves on a top surface and lower balls on a bottom surface; and a lower guide installed on the bottom surface of the ball holder having slide grooves on a top surface, wherein the slide grooves are slidably coupled with the lower balls of the ball holder and have lengths in the Y axial direction or the X axial direction perpendicular to a longitudinal direction of the slide grooves of the automatic focusing unit.

Herein, the upper balls and the lower balls may be provided on the top surface and the bottom surface of the ball holder by exposing each of the balls to both the top surface and the bottom surface of the ball holder.

Further, the upper balls and the lower balls may be provided on the top surface and the bottom surface of the ball holder separately.

At this time, the upper balls and the lower balls may be provided on the top surface and the bottom surface of the ball holder separately, wherein the upper balls and the lower balls are preferably provided on the same line along an optical axial direction of the automatic focusing unit.

And, preferably, the upper balls and the lower balls are arranged in a 3 point support method in order to stably move the automatic focusing unit in the X axial direction and the Y axial direction.

Meanwhile, the slide grooves of the automatic focusing unit may be formed in a "V" shape.

Further, the slide grooves of the lower guide may be also formed in the "V" shape.

Meanwhile, the image stabilizing apparatus for the camera module may further include a lower housing installed at a lower part of the lower guide; and an upper housing coupled to the lower housing to surround the automatic focusing unit.

The driving unit may include an X axial moving actuator provided with an X axial voice coil installed at a portion of a circumference positioned in the X axial direction of the circumference of the automatic focusing unit and an X axial magnet installed inside the upper housing to correspond to the X axial voice coil; and an Y axial moving actuator provided with an Y axial voice coil installed at a portion of the circumference positioned in the Y axial direction of the circumference of the automatic focusing unit and an Y axial magnet installed inside the upper housing to correspond to the Y axial voice coil.

Meanwhile, an image sensor may be mounted on a bottom surface inside the lower housing.

And, the automatic focusing unit may include a lens barrel with a lens group and a driving device for reciprocating the lens barrel in the optical direction inside.

And, an elastic buffering member may further provided on the lower surface of the lower guide.

Meanwhile, the image stabilizing apparatus for the camera module may further include a position detection device to detect a moving position of the automatic focusing unit in the X axial direction or a moving position thereof in the Y axial direction.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic exploded perspective view illustrating an image stabilizing apparatus for a camera module from top side from a top side in accordance with one embodiment of the present invention; and FIG. 2 is a schematic exploded perspective view illustrating the image stabilizing apparatus for the camera module from a bottom side in accordance with the one embodiment of the present invention.

DETAILED DESCRIPTION OF THE PREFERABLE EMBODIMENTS

Hereinafter, a preferable embodiment of an image stabilizing apparatus for a camera module in accordance with the present invention will be described in detail with reference to the accompanying drawings.

FIG. 1 is a schematic exploded perspective view illustrating an image stabilizing apparatus for a camera module from a top side in accordance with one embodiment of the present invention and FIG. 2 is a schematic exploded perspective view illustrating the image stabilizing apparatus for the camera module from a bottom side in accordance with the one embodiment of the present invention.

Embodiment of an Image Stabilizing Apparatus for a Camera Module

As shown in FIG. 1 and FIG. 2, in accordance with one embodiment of the present invention, an image stabilizing apparatus for a camera module includes an automatic focusing unit 100, a driving unit 200, a ball holder 300, a lower guide 400, a lower housing 500, and an upper housing 600.

The automatic focusing unit 100 as a unit to perform an automatic focusing function of the camera module, includes a lens barrel 150 with a lens group L and a driving device(not shown) for reciprocating the lens barrel 150 in an optical axial(Z axial) direction inside.

Although not shown specifically, the driving device for reciprocating the lens barrel 150 in the optical axial(Z axial) direction, includes a device for moving the lens barrel 150 by various driving methods such as a voice coil actuator, a piezoelectric actuator, or an actuator using a shape memory alloy.

Herein, the automatic focusing unit 100 includes slide grooves 110 having lengths in an Y axial direction perpendicular to an optical axis(Z axis) on a bottom surface.

At this time, it is preferable to arrange the slide grooves 110 of the automatic focusing unit 100 by a 3 point support method to stably move the automatic focusing unit 100.

Further, the slide grooves 110 of the automatic focusing unit 100 are preferably formed in a "V" shape.

The driving unit 200 as a unit to move the automatic focusing unit 100 in the X axial direction or an Y axial direction, includes an X axial moving actuator 210 for moving the automatic focusing unit 100 in the X axial direction and an Y axial moving actuator 220 for moving the automatic focusing unit 100 in the Y axial direction.

At this time, the X axial moving actuator 210 includes an X axial voice coil 211 installed at a portion of a circumference positioned in the X axial direction of the circumference of the automatic focusing unit 100 and an X axial magnet 212 installed inside the upper housing 600 to correspond to the X axial voice coil 211.

Further, the Y axial moving actuator 220 includes an Y axial voice coil 221 installed at a portion of the circumference positioned in the Y axial direction of the circumference of the automatic focusing unit 100 and an Y axial magnet 222 installed inside the upper housing 600 to correspond to the Y axial voice coil 221.

The ball holder 300 is installed on the bottom surface of the automatic focusing unit 100 and includes upper balls 310 slidably coupled to the slide grooves 110 of the automatic focusing unit 100 on a top surface and lower balls 320 on a bottom surface.

Herein, the upper balls 310 and the lower balls 320 provided on the ball holder may be formed by coupling each of the balls to be exposed to both the top surface and the bottom surface of the ball holder 300, that is, one sides of the each of the balls exposed to the top surface of the ball holder 300 form the upper balls 310 and the other sides thereof exposed to the bottom surface of the ball holder 300 form the lower balls 320.

Further, although not shown in detail, the upper balls 310 and the lower balls 320 may be provided on the top surface and the bottom surface of the ball holder 300 separately by being respectively formed in a hemispheric shape.

At this time, although the upper balls 310 and the lower balls 320 are provided on the top surface and the bottom surface of the ball holder 300 separately, they are preferably provided on the same line along the optical axial(Z axial) direction of the automatic focusing unit 100.

And, the upper balls 310 are arranged by the 3 point support method to correspond to the slide grooves 110 of the automatic focusing unit 100 and the lower balls 320 are also arranged by the 3 point support method to correspond to the upper balls 310.

As described above, the image stabilizing apparatus for the camera module in accordance with the present invention is capable of reducing the number of the balls by performing correction of shakes in the Y axial direction and the X axial direction of the automatic focusing unit 100 through the upper balls 310 and the lower balls 320 exposed to the top surface and the bottom surface of the ball holder 300, thereby reducing a manufacture cost.

Further, the image stabilizing apparatus for the camera module in accordance with the present invention is capable of improving workability and minimizing separation of the balls by assembling the ball holder 300 in a state of installing the upper balls 310 and the lower balls 320 on the ball holder 300.

The lower guide 400 is installed on the bottom surface of the ball holder 300 and includes slide grooves 420 on a top surface, wherein the slide grooves are slidably coupled with the lower balls 320 of the ball holder 300 and have lengths in the X axial direction perpendicular to a longitudinal direction of the slide grooves 110 of the automatic focusing unit 100.

Herein, the slide grooves 420 of the lower guide 400 are also arranged by the 3 point support method to correspond to the lower balls 320 of the ball holder 300.

At this time, the slide grooves 420 of the lower guide 400 may be formed in the "V" shape similar to that of the slide grooves 110 of the automatic focusing unit 100.

Meanwhile, elastic shock absorbing members 450 are further provided on a bottom surface of the lower guide 400.

Herein, because the shock absorbing members 450 maintain a compressed state while applying power in the optical axial(Z axial) direction between the lower guide 400 and the lower housing 500, they are capable of improving an assembly yield by increasing contact force between the automatic focusing unit 100 and ball holder 300 and the lower guide 400 and of preventing separation of the balls by stably moving the automatic focusing unit 100 in the X axial direction and the Y axial direction.

Meanwhile, the ball holder 300 and lower guide 400 may include through holes through which light travels at centers respectively.

The lower housing 500 is installed at a lower part of the lower guide 400 and mounts an image sensor 700 surface inside.

And, the upper housing 600 may be coupled to the lower housing 500 to surround the automatic focusing unit 100.

Meanwhile, although not shown, the image stabilizing apparatus for the camera module in accordance with one embodiment of the present invention may further include a position detection device to detect a moving position of the automatic focusing unit 100 in the X axial direction or a moving position thereof in the Y axial direction.

Hereinafter, a correction process of the image stabilizing apparatus for the camera module in accordance with one embodiment of the present invention will be described.

First of all, in order to move the automatic focusing unit 100 in the horizontal X axial direction, when operating the X axial moving actuator 210 of the driving unit 200, the automatic focusing unit 100 is moved in the X axial direction by a coupling structure of the lower balls 320 of the ball holder 300 and the slide grooves 420 of the lower guide 400 in a state of being bound to the ball holder 300 by a coupling structure of the slide grooves 110 of the automatic focusing unit 100 and the upper balls 310 of the ball holder 300.

And, to in order to move the automatic focusing unit 100 in the horizontal Y axial direction, when operating the Y axial moving actuator 220 of the driving unit 200, the automatic focusing unit 100 is moved in the Y axial direction by a coupling structure of the slide grooves 110 and the upper balls 310 of the ball holder 300.

At this time, the ball holder 300 is bound by a coupling structure of the lower balls 320 and the slider grooves 420 of the lower guide 400.

As described above, in accordance with the present invention, the image stabilizing apparatus for the camera module is capable of effectively stabilizing an image of the camera module, implementing miniaturization and slimness of the camera module, and reducing a manufacture cost of the camera module by supplying the two-axial correction structure to perform correction in the X axial direction or the Y axial direction of the automatic focusing unit through a ball holder having upper balls and lower balls.

As described above, although the preferable embodiment of the present invention has been shown and described, it will be appreciated by those skilled in the art that substitutions, modifications and changes may be made in this embodiment without departing from the principles and spirit of the general inventive concept, the scope of which is defined in the appended claims and their equivalents.

What is claimed is:

1. An image stabilizing apparatus for a camera module comprising:
    an automatic focusing unit including a plurality of slide grooves with lengths in an X axial direction or in a Y axial direction, the X and Y axial directions each being perpendicular to an optical axis of the automatic focusing unit, the slide grooves being on a bottom surface of the automatic focusing unit;
    a driving unit moving the automatic focusing unit in the X axial direction or the Y axial direction;
    a ball holder which is installed on the bottom surface of the automatic focusing unit and includes a plurality of upper balls slidably coupled to the slide grooves of the automatic focusing unit on a top surface of the ball holder and a plurality of lower balls on a bottom surface of the ball holder;
    a lower guide which is installed on the bottom surface of the ball holder and includes a plurality of slide grooves on a top surface of the lower guide, wherein the slide grooves of the lower guide are slidably coupled with the lower balls of the ball holder and include lengths in the Y axial direction or the X axial direction and perpendicular to a longitudinal direction of the slide grooves of the automatic focusing unit;
    a lower housing installed at a lower part of the lower guide;
    an upper housing coupled to the lower housing to surround the automatic focusing unit; and
    an image sensor mounted on an inside of the lower housing.

2. The image stabilizing apparatus for the camera module of claim 1, wherein the upper balls and the lower balls are provided on the top surface and the bottom surface of the ball holder respectively by exposing each of the balls to both the top surface and the bottom surface of the ball holder.

3. The image stabilizing apparatus for the camera module of claim 1, wherein the upper balls and the lower balls are provided on the top surface and the bottom surface separately, wherein the upper balls and the lower balls are provided on a same line along the optical axis of the automatic focusing unit.

4. The image stabilizing apparatus for the camera module of claim 1, wherein the upper balls and the lower balls are arranged by a 3 point support method.

5. The image stabilizing apparatus for the camera module of claim 1, wherein the slide grooves of the automatic focusing unit are formed in a "V" shape.

6. The image stabilizing apparatus for the camera module of claim 1,
    wherein the driving unit includes:
    an X axial moving actuator provided with an X axial voice coil installed at a portion of a circumference positioned in the X axial direction of the circumference of the automatic focusing unit and an X axial magnet installed inside the upper housing to correspond to the X axial voice coil; and
    a Y axial moving actuator provided with a Y axial voice coil installed at a portion of the circumference positioned in the Y axial direction of the circumference of the automatic focusing unit and a Y axial magnet installed inside the upper housing to correspond to the Y axial voice coil.

7. The image stabilizing apparatus for the camera module of claim 1, wherein the automatic focusing unit further includes a lens barrel comprising a lens group and a driving device reciprocating the lens barrel about the optical axis.

8. The image stabilizing apparatus for the camera module of claim 1, wherein the slide grooves of the lower guide are formed in a "V" shape.

9. The image stabilizing apparatus for the camera module of claim 1, wherein the lower guide includes a plurality of elastic buffering members on a lower surface of the lower guide.

10. The image stabilizing apparatus for the camera module of claim 1, further comprising:
a position detection device to detect a moving position of the automatic focusing unit in the X axial direction or a moving position thereof in the Y axial direction.

11. An image stabilizing apparatus for a camera module comprising:
an automatic focusing unit including a plurality of slide grooves with lengths in an X axial direction or in a Y axial direction, the X and Y axial directions each being perpendicular to an optical axis of the automatic focusing unit, the slide grooves being on a bottom surface of the automatic focusing unit;
a driving unit moving the automatic focusing unit in the X axial direction or the Y axial direction;
a ball holder which is installed on the bottom surface of the automatic focusing unit and includes a plurality of upper balls slidably coupled to the slide grooves of the automatic focusing unit on a top surface of the ball holder and a plurality of lower balls on a bottom surface of the ball holder; and
a lower guide which is installed on the bottom surface of the ball holder and includes a plurality of slide grooves on a top surface of the lower guide, wherein the slide grooves of the lower guide are slidably coupled with the lower balls of the ball holder and include lengths in the Y axial direction or the X axial direction and perpendicular to a longitudinal direction of the slide grooves of the automatic focusing unit,
wherein the upper balls and the lower balls are provided on the top surface and the bottom surface of the ball holder respectively by exposing each of the balls to both the top surface and the bottom surface of the ball holder.

12. An image stabilizing apparatus for a camera module comprising:
an automatic focusing unit including a plurality of slide grooves with lengths in an X axial direction or in a Y axial direction, the X and Y axial directions each being perpendicular to an optical axis of the automatic focusing unit, the slide grooves being on a bottom surface of the automatic focusing unit;
a driving unit moving the automatic focusing unit in the X axial direction or the Y axial direction;
a ball holder which is installed on the bottom surface of the automatic focusing unit and includes a plurality of upper balls slidably coupled to the slide grooves of the automatic focusing unit on a top surface of the ball holder and a plurality of lower balls on a bottom surface of the ball holder; and
a lower guide which is installed on the bottom surface of the ball holder and includes a plurality of slide grooves on a top surface of the lower guide, wherein the slide grooves of the lower guide are slidably coupled with the lower balls of the ball holder and include lengths in the Y axial direction or the X axial direction and perpendicular to a longitudinal direction of the slide grooves of the automatic focusing unit,
wherein the upper balls and the lower balls are provided on the top surface and the bottom surface separately, wherein the upper balls and the lower balls are provided on a same line along the optical axis of the automatic focusing unit.

13. An image stabilizing apparatus for a camera module comprising:
an automatic focusing unit including a plurality of slide grooves with lengths in an X axial direction or in a Y axial direction, the X and Y axial directions each being perpendicular to an optical axis of the automatic focusing unit, the slide grooves being on a bottom surface of the automatic focusing unit;
a driving unit moving the automatic focusing unit in the X axial direction or the Y axial direction;
a ball holder which is installed on the bottom surface of the automatic focusing unit and includes a plurality of upper balls slidably coupled to the slide grooves of the automatic focusing unit on a top surface of the ball holder and a plurality of lower balls on a bottom surface of the ball holder;
a lower guide which is installed on the bottom surface of the ball holder and includes a plurality of slide grooves on a top surface of the lower guide, wherein the slide grooves of the lower guide are slidably coupled with the lower balls of the ball holder and include lengths in the Y axial direction or the X axial direction and perpendicular to a longitudinal direction of the slide grooves of the automatic focusing unit;
a lower housing installed at a lower part of the lower guide; and
an upper housing coupled to the lower housing to surround the automatic focusing unit, wherein the driving unit includes:
an X axial moving actuator provided with an X axial voice coil installed at a portion of a circumference positioned in the X axial direction of the circumference of the automatic focusing unit and an X axial magnet installed inside the upper housing to correspond to the X axial voice coil, and
a Y axial moving actuator provided with a Y axial voice coil installed at a portion of the circumference positioned in the Y axial direction of the circumference of the automatic focusing unit and a Y axial magnet installed inside the upper housing to correspond to the Y axial voice coil.

* * * * *

UNITED STATES PATENT AND TRADEMARK OFFICE
CERTIFICATE OF CORRECTION

| | | |
|---|---|---|
| PATENT NO. | : 7,912,361 B2 | Page 1 of 1 |
| APPLICATION NO. | : 12/292846 | |
| DATED | : March 22, 2011 | |
| INVENTOR(S) | : Soo Cheol Lim et al. | |

It is certified that error appears in the above-identified patent and that said Letters Patent is hereby corrected as shown below:

First Page Column 1, Line 1 delete "Eletro-Mechanics" and insert -- Electro-Mechanics --, therefor.

Signed and Sealed this
Thirteenth Day of September, 2011

David J. Kappos
*Director of the United States Patent and Trademark Office*